United States Patent [19]
Young

[11] 3,831,492
[45] Aug. 27, 1974

[54] OVERLOAD PROTECTION DEVICE FOR COUNTERBALANCE VEHICLES

[75] Inventor: Michael R. Young, Farmington, Mich.

[73] Assignee: Eaton Corporation, Cleveland, Ohio

[22] Filed: Dec. 4, 1972

[21] Appl. No.: 312,087

[52] U.S. Cl.................... 91/411 R, 91/412, 187/17, 214/674, 137/596.18
[51] Int. Cl............................................ F15b 11/16
[58] Field of Search........... 91/411 R, 412; 214/673, 214/674; 187/9, 17; 137/596.18

[56] References Cited
UNITED STATES PATENTS

| | | | |
|---|---|---|---|
| 2,844,942 | 7/1958 | Reynolds | 91/412 |
| 3,307,656 | 3/1967 | Susag | 187/9 |
| 3,415,161 | 12/1968 | Mindrum | 91/19 |

FOREIGN PATENTS OR APPLICATIONS

| | | | |
|---|---|---|---|
| 666,385 | 7/1963 | Canada | 214/674 |

Primary Examiner—Edgar W. Geoghegan
Attorney, Agent, or Firm—Teagno & Toddy

[57] ABSTRACT

An overload protection device for a vehicle, such as a lift truck, having a primary load member or mast pivotally mounted on a frame and a secondary load member or forks movably mounted on the primary member and adapted to hold a load. The overload protection device includes a fluid actuated double acting piston-cylinder and a pressure actuated valve operable in response to a pressure signal representative of the difference in pressure on opposite sides of the piston to prevent movement of the load members in one direction when the overturning moment on the vehicle exceeds a safe value. A stop assembly is provided in the piston-cylinder to prevent the pressure of the fluid on either side of the piston from becoming zero when the piston approaches either end of the cylinder. The valve includes an override mechanism to allow pivotal movement of the primary member, irrespective of the presence of an overload signal, whenever the secondary member is in a given position relative to the primary member. Damping means are provided to prevent false actuation of the valve in the presence of rapidly changing pressure signals from the piston-cylinder. The valve is further designed to decrease the rate of pivotal movement of the primary member in proportion to increases in the overturning moment and to rapidly stop movement of the secondary member relative to the primary member when the overturning moment approaches an unsafe value.

39 Claims, 7 Drawing Figures

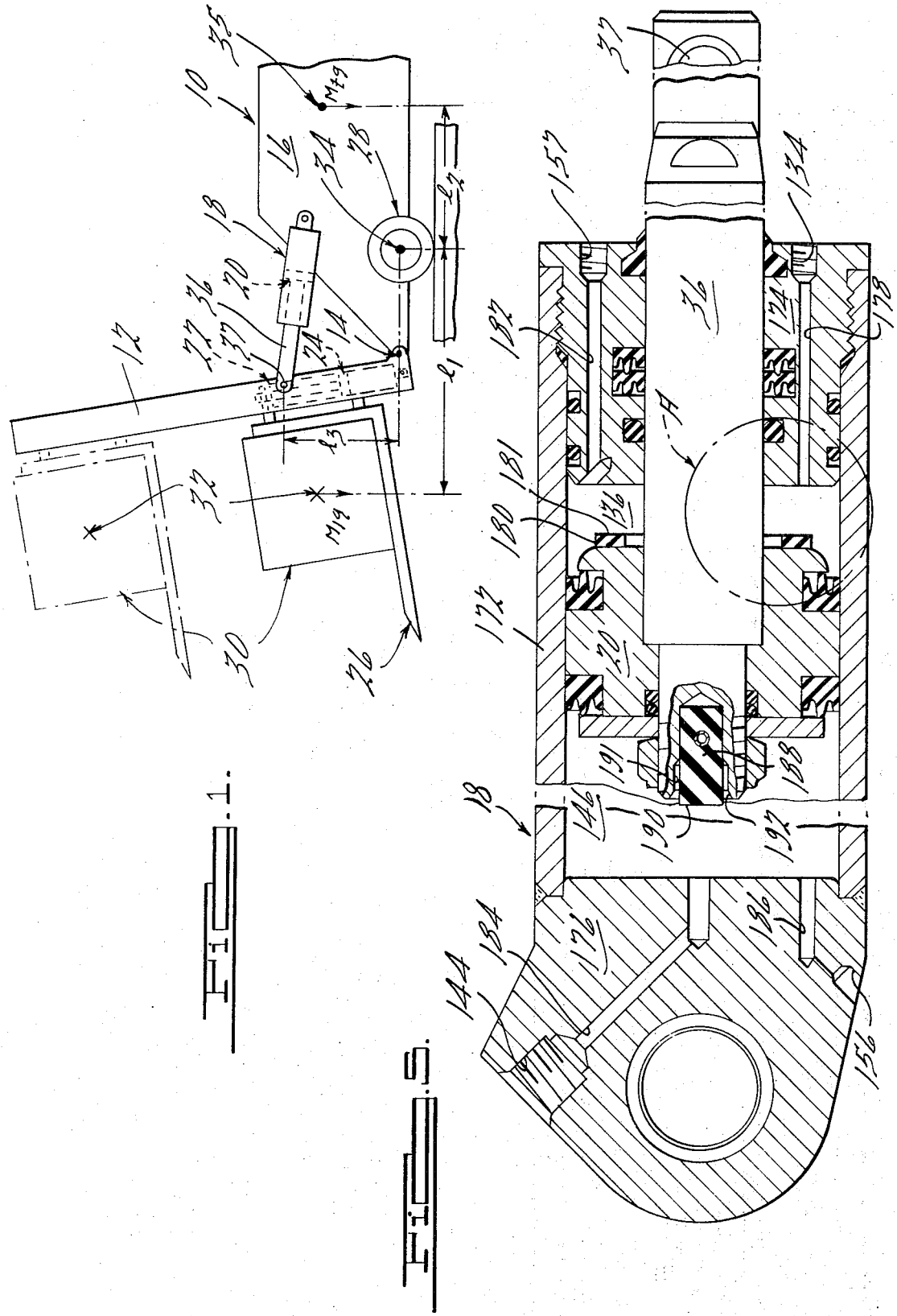

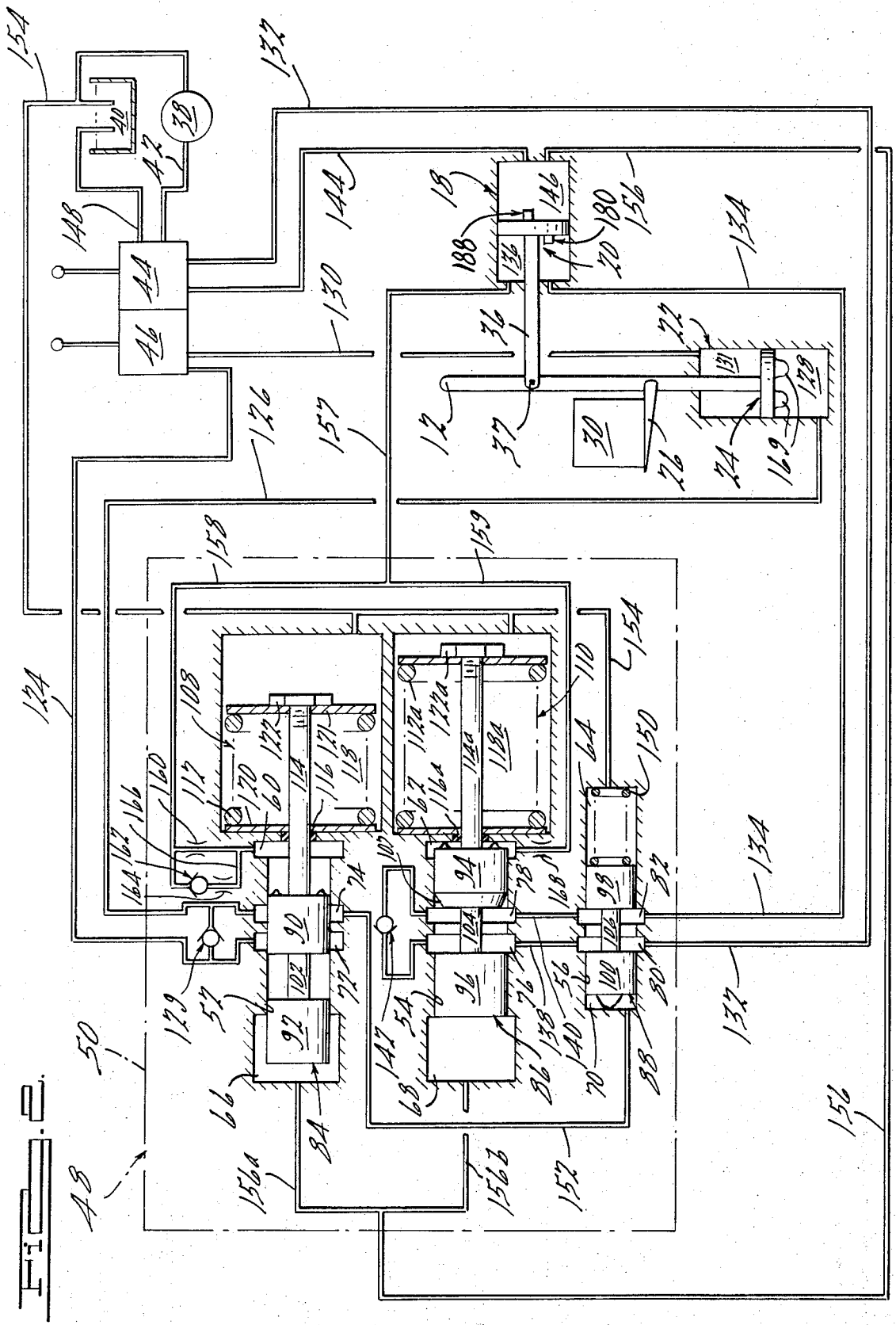

OVERLOAD PROTECTION DEVICE FOR COUNTERBALANCE VEHICLES

BACKGROUND OF THE INVENTION

1. Field of the Invention

This invention relates generally to counterbalance vehicles that are capable of lifting, tilting or shifting a load relative to the vehicle frame and, more particularly, to an overload protection device for use on such a vehicle to prevent overturning of the vehicle during movement of the load.

2. Description of the Prior Art

The disclosure is directed primarily toward overload protection devices for lift trucks. The lift truck, however, is disclosed only as a representative of the general class of counterbalance vehicles, which also includes, for example, front end loaders, back hoes, tree diggers, cranes, and tow trucks.

A lift truck is used in industrial and agricultural applications to move heavy loads from one place to another. It includes a vertically extending primary load member, commonly referred to as a mast, which is pivotally connected to a frame that is generally located on wheels. A piston-cylinder device is generally used to tilt the mast relative to the frame. A pair of secondary load members, commonly referred to as forks, are movable along the mast and, in certain applications, are capable of traversing the mast. Such a truck can transport, elevate, lower, shift and tilt a load for placement purposes.

One of the major problems encountered in operating a vehicle such as a lift truck is the tilting of the vehicle frame about one of the wheel axles, causing the vehicle to overturn. A forward or rearward overturn condition comes into existence when the center of gravity of the lift truck, including the load, falls respectively forward or rearward of the front or rear axle of the truck. Such a condition can be caused by any one or combination of the following factors: the size of the load; the distance of the composite center of gravity of the mast, forks and load from the respective axle; the dynamic forces created during acceleration and deceleration of the truck, and the dynamic forces created during elevating, lowering and tilting. Similarly, the lift truck can be overturned sideways around the front and rear wheels on either side of the lift truck. In sideward overturning the dynamic forces of shifting must also be considered as well as the distance of the composite center of gravity of the mast, forks and load from the wheels of the truck.

Most attempts to solve the overturning problem in lift trucks have been directed to forward overturning. These attempts have included, among others, an overload responsive device located on the rear axle of the truck — illustrated in U.S. Letters Pat. No. 2,774,437, Remde; a stress responsive tipping moment indicator attached to the mast — illustrated in U.S. Letters Pat. No. 2,767,394, Arnot et al; a rear axle load detecting arrangement — illustrated in U.S. Letters Pat. No. 2,751,994, Remde; a tilt cylinder pressure differential detecting systems — illustrated in U.S. Letters Pat. No. 3,007,593, Hancock; and a load detecting device used to measure the load on the forks — illustrated in U.S. Letters Pat. No. 3,059,710, Pien. The arrangements disclosed in each of the above-referred to patents have, however, one or more of the following faults: they fail to permit certain needed operations of the lift truck when a non-dangerous overload condition exists; they are too expensive; they are difficult to install; they reduce the efficiency of the vehicle; they operate in a manner which can cause overturning of the vehicle; they do not detect the overturning moment created by the load; they cannot be easily retrofitted on existing vehicles; they create false overload signals causing intermittent operation of the vehicle when an overload condition does not exist; and they lack flexibility for readily adapting them to a wide range of vehicles.

SUMMARY OF THE INVENTION

The present invention has application to any counterbalance vehicle of the type including a mast, boom, arm or other primary load member movable relative to the vehicle frame by a motor member interconnecting the primary load member and the frame.

According to one feature of the invention wherein the motor member comprises a fluid pressure piston-cylinder device, means is provided which operate to sense the pressure differential on opposite sides of the piston and transmit this differential signal to a suitable device to preclude further movement of the primary load member relative to the frame, and other means is provided which operate in response to movement of the piston to a position proximate one end of the cylinder to seal the fluid supply passage adjacent that cylinder end and thereby preclude the loss of a pressure signal from that cylinder end.

According to another feature of the invention wherein the vehicle includes a secondary load member mounted on and movable relative to the primary load member, means is provided to sense an overturning moment on the vehicle and preclude further movement of the primary load member relative to the frame when the overturning moment approaches an unsafe value, and further means is provided to sense a given position of the secondary load member relative to the primary load member and allow further movement of the primary load member irrespective of the value of the overturning moment.

According to a further feature of the invention the magnitude of the moment tending to overturn the vehicle is continuously sensed and the rate, at which the primary load member is moved by the motor member relative to the frame, progressively and proportionately decreases as the sensed moment increases toward an unsafe overturning moment.

According to still another feature of the invention wherein the vehicle includes a secondary load member mounted on and movable relative to the primary load member by a secondary motor member, the magnitude of the moment tending to overturn the vehicle is continuously sensed, and the secondary motor member is abruptly deactuated as the sensed moment approaches an unsafe overturning moment.

According to yet a further feature of the invention a continuous signal, corresponding to a signal representative of the magnitude of the movement tending to overturn the vehicle, is transmitted to a suitable device to preclude further movement of the primary load member relative to the frame when the continuous signal indicates that further movement of the primary load member will create a moment which will overturn the vehicle, and means is provided to continuously condition the continuous signal to make it nonresponsive to spurious representative signals.

BRIEF DESCRIPTION OF THE DRAWINGS

A preferred embodiment of the invention is disclosed in the accompanying drawings, wherein:

FIG. 1 is a schematic, fragmentary, side elevation view of a lift truck;

FIG. 2 is a schematic, plan view of a hydraulic circuit for the lift truck illustrated in FIG. 1;

FIG. 5 is a side elevation view, in section, of one half of a piston-cylinder device used to move the mast of the lift truck relative to the frame;

DETAILED DESCRIPTION OF THE EMBODIMENTS

Figure 6:
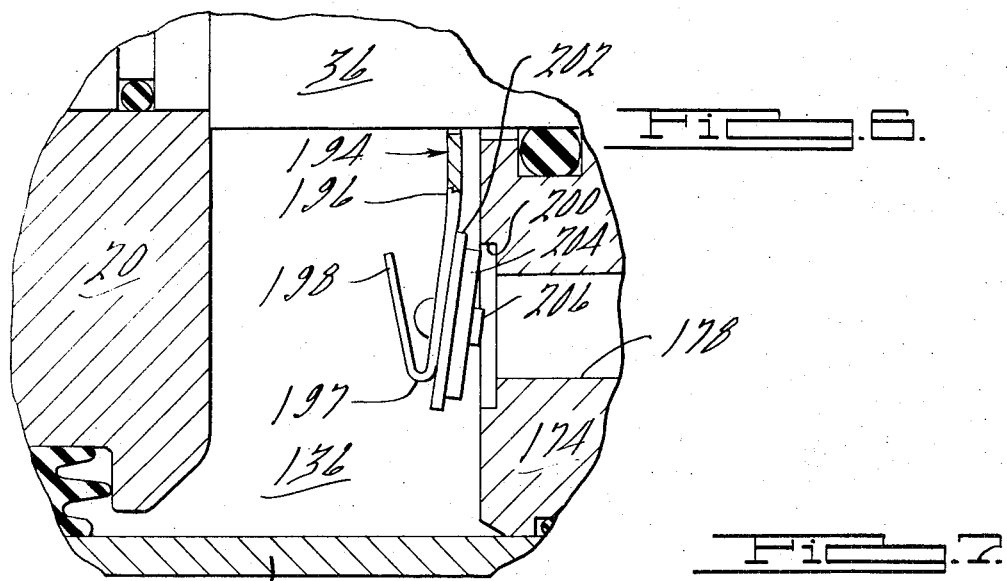
FIG. 6 is an enlarged view of area "A" in FIG. 5 embodying other features of the invention.

General Construction and Operation of a Lift Truck

FIG. 1 illustrates a lift truck 10 having a primary load member or mast 12 pivotally mounted about a generally horizontal axis 14 on a frame 16. A tilt cylinder 18 and a tilt piston 20 interengaged in a known manner and movable relative to each other are respectively pivotally connected to frame 16 and mast 12. Movement of tilt piston 20 relative to tilt cylinder 18 results in pivotal movement of mast 12 about axis 14. A lift cylinder 22 and a lift piston 24 interengaged in a known manner and movable relative to each other are mounted in mast 12 and are connected to a pair of secondary load members or forks 26 (only one illustrated). Movement of lift piston 24 relative to lift cylinder 22 results in the raising and lowering of forks 26 relative to mast 12. Frame 16 is mounted on front and rear sets of wheels 28 (only one illustrated).

In operation, a load 30 is located on forks 26 and is moved from one location to another. The load can be tilted forward and reverse about axis 14 by tilt cylinder 18 and tilt piston 20 as well as raised and lowered along mast 12 by lift cylinder 22 and lift piston 24.

A forward overturn moment is created by a force representative of the weight of load 30, mast 12 and forks 26 acting at their combined center of gravity, which is indicated by point 32, about the axle 34 of the forward wheels 28. The forward overturning moment is normally counteracted by a stabilizing moment about axle 34 of forward wheels 28 created by a force representative of the weight of lift truck 10 acting at the truck's center of gravity, which is indicated by point 35 on frame 16. During lifting of a forwardly tilted load 30 and formed tilting of the load, the distance of center of gravity 32 from axle 34 is increased resulting in an increase in the forward overturning moment. When the forward overturning moment exceeds the stabilizing moment of the truck an overturn condition comes into existence causing truck 10 to tip forward rotating it about axle 34.

As illustrated in FIG. 1 the magnitude of the forward overturning moment is equivalent to $m_1(g + a)l_1$, where: $m_1$ represents the mass of a portion of the mast 12, forks 26 and load 30; $g$ is the force of gravity; $a$ is the acceleration of load 30; and $l_1$ is the distance from axle 34 to the vertical projection of center of gravity 32. The length of the effective moment arm $l_1$ is primarily dependent upon the relative position of load 30 on forks 26, the angle of tilt of mast 12 and the elevational height of load 30. The stabilizing moment of lift truck 10 is dependent upon the mass of lift truck 10 and the location of center of gravity 35. The magnitude of the stabilizing moment is equal to $m_t g l_2$, where: $m_t$ is the mass of lift truck 10; $g$ is the acceleration of gravity; and $l_2$ is the distance from axle 34 to the vertical projection of center of gravity 35. Under any given load condition the factors $m_1$, $g$, $m_t$, and $l_2$ are relatively constant (assuming the vehicle remains horizontal). When truck 10 is stationary, $m_t g l_2$ must be greater than $m_1(g + a)l_1$ in order for the truck to be stable, i.e., located on all four wheels 28.

The force tending to forward tilt mast 12 is counteracted by a force exerted on the rod 36 of tilt piston 20 which acts over a relatively constant moment arm $l_3$ which is equal to the distance from the contact point 37 of rod 36 to mast 12 to the horizontal projection of axle 34 which projects through axis 14. Since there are no other balancing forces acting on mast 12 it is apparent that the forward overturning moment is always proportional to the moment $f_{tp} l_3$ where $f_{tp}$ is the force exerted on rod 36 of tilt piston 20. Since the moment arm $l_3$ is relatively constant during operation of truck 10, the force on rod 36 is very closely proportional to the forward overturning moment. To measure the forward overturning moment, it is, therefore, only necessary to measure the force on rod 36.

The force on rod 36 can be measured in many ways. The rod could be modified to incorporate strain gages or a load cell. Such components are, however, very expensive. The preferred embodiment set out in this application recognizes that the force $f_{tp}$ on rod 36 is equal to the net force created by the pressure existing in tilt cylinder 18 on opposite sides of tilt piston 20. The major advantages of using the pressure in the tilt cylinder are: very lost cost; high accuracy; excellent dynamic response; and ease of adaptability to all vehicles utilizing piston-cylinder devices for movement of a load member.

Construction of the Overload Protection Device Illustrated in FIG. 2

A hydraulic circuit is schematically illustrated in FIG. 2 for preventing lift truck 10 from overturning as a result of either lifting load 30 too high on mast 12 or tilting the mast too far forward relative to frame 16. A pump 38 is used to direct hydraulic fluid from a reservoir 40 through a conduit 42 into a tilt control 44 and a lift control 46. Tilt control 44 is used to direct hydraulic fluid into one of the two chambers defined within tilt cylinder 18 at the opposed sides of tilt piston 20 and to remove hydraulic fluid from the other chamber. The addition and removal of fluid results in the movement of tilt piston 20 relative to tilt cylinder 18 and a corresponding tilting movement of mast 12. Lift control 46 is used to direct hydraulic fluid into and out of the two chambers defined within lift cylinder 22 at the opposite sides of lift piston 24 to cause the piston to move relative to the cylinder to raise or lower the forks 26 relative to mast 12.

An overload control valve 48 is interposed between the controls 44 and 46 and the cylinders 18 and 22. Valve 48 comprises a casing 50, indicated by dot-dash lines, having a lift spool cavity 52, a tilt spool cavity 54 and a tilt check spool cavity 56. The cavities 52, 54 and 56, respectively, have a first pressure chamber 60, 62 and 64 and a second pressure chamber 66, 68 and 70. Each cavity 52, 54 and 56 further includes a pair of enlarged annular spaces, respectively indicated as 72, 74; 76, 78; and 80, 82, intermediate the respective first and second pressure chambers of each cavity.

A lift spool 84, a tilt spool 86 and a tilt check spool 88 are respectively located in lift spool cavity 52, tilt spool cavity 54 and tilt check spool cavity 56. The three spools 84, 86 and 88 are of the same basic construction, each having a pair of enlarged portions 90, 92; 94, 96; and 98, 100 respectively, which are located adjacent the first and second pressure chambers of the respective cavity. Each of the enlarged portions on the spools is in sliding engagement with the respective cavity. The two enlarged portions on each spool are interconnected by a necked-down center section 102, 104 and 106, respectively, for lift spool 84, tilt spool 86 and tilt check spool 88. In the preferred embodiment the end 107 of enlarged portion 94 of tilt spool 86 adjacent center section 104 is chamfered.

When the spools 84, 86 and 88 are located in a first position, the respective center section is aligned with the enlarged annular spaces in the respective cavity to permit fluid to flow from one annular space around the center section into the other annular space. When the spools 84, 86 and 88 are located in a second position, the respective enlarged portion 90, 94 and 100 will seal the annular spaces in the corresponding cavity from one another. For ease of understanding the location of the two positions, lift spool 84 is illustrated in FIG. 2 in the second position while tilt spool 86 and tilt check spool 88 are illustrated in the first position.

Lift spool 84 and tilt spool 86 are biased by spring packs 108 and 110, respectively, toward the first position. Spring pack 108 comprises a compression spring 112, having a relatively low rate, encircling a rod 114 connected to enlarged portion 90 of lift spool 84. Rod 114 projects through a seal 116 which separates first pressure chamber 60 from compression spring cavity 118 and prevents a flow of fluid therebetween. Spaced washers 120 and 121 contact the ends of compression spring 112 and encircle rod 114. A nut 122 is in threaded engagement with the end of rod 114 and is used in combination with washer 121 to compress compression spring 112 to a relatively high preload.

Spring pack 110 connected to tilt spool 86 is basically of the same construction as spring pack 108. The components of spring pack 110 which correspond with the components of spring pack 108 are indicated by corresponding numerals followed by an *a*. Thus spring 112 of spring pack 108 corresponds to spring 112*a* of spring pack 110. Spring 112*a*, however, has a relatively high rate and is compressed to a relatively low preload.

A conduit 124 provides fluid communication between lift control 46 and annular space 72. Another conduit 126 is in communication with annular space 74 and a chamber 128 within lift cylinder 22 at the lower side of lift piston 24, as illustrated in FIG. 2. A check valve 129 interconnects conduit 124 and conduit 126. Fluid can only flow through check valve 129 from conduit 126 to conduit 124. Another conduit 130 provides fluid communication between lift control 46 and a chamber 131 within lift cylinder 22 at the upper side of lift piston 24, as illustrated in FIG. 2.

A conduit 132 provides fluid communication between tilt control 44 and annular space 80. Another conduit 134 interconnects annular space 82 with the forward chamber 136 within tilt cylinder 18 at the left side of tilt piston 20, as illustrated in FIG. 2. Conduits 138 and 140 respectively interconnect annular spaces 80 and 76, and 82 and 78. A check valve 142 further interconnects annular spaces 76 and 78. Fluid can only flow through check valve 142 from annular space 76 to annular space 78. A conduit 144 interconnects the rearward chamber 146 within tilt cylinder 18 at the right end of tilt piston 20, as illustrated in FIG. 2, with tilt control 44. Conduit 148 connects tilt and lift controls 44 and 46 to reservoir 40.

A relatively low rate spring 150 compressed to a relatively low preload is located in first pressure chamber 64 and normally biases tilt check spool 88 to the left in FIG. 2 to the first position to align necked-down center section 106 with annular spaces 80 and 82. A conduit 152 interconnects second pressure chamber 70 of the tilt check spool cavity 56 with annular space 74 of lift spool cavity 52. Another conduit 154 provides fluid communication between first pressure chamber 64 in which spring 150 is located, with spring cavities 118 and 118*a* and reservoir 40.

A conduit 156, together with branch conduits 156*a* and 156*b*, interconnects the rearward chamber 146 within tilt cylinder 18 with second pressure chambers 66 and 68 of lift spool cavity 52 and tilt spool cavity 54. Another conduit 157 interconnects the forward chamber 136 within tilt cylinder 18 with first pressure chamber 60 via branch conduit 158 and with first pressure chamber 62 via branch conduit 159. A relatively small orifice 160 is located in ranch conduit 158 intermediate forward chamber 136 of tilt cylinder 18 and first pressure chamber 60. A check valve 162 and a relatively large orifice 164 are located in series in a conduit 166 which is connected in parallel to orifice 160. Check valve 162 permits the flow of fluid in one direction from forward chamber 136 to first pressure chamber 60 of lift spool cavity 52. Another orifice 168 is located within branch conduit 159 intermediate forward chamber 136 and first pressure chamber 62.

A number of buttons 169 on one side of lift piston 24 project away from the piston into chamber 128. The buttons are designed to contact the end of lift cylinder 22 when load engaging members 26 are in their fully lowered position and at the same time still allow conduit 126 to communicate with chamber 128.

Operating of the Overload Protection Device Illustrated in FIG. 2

Tilting the Mast

During forward tilting of mast 12, tilt control 44 is actuated to direct fluid from pump 38 via conduit 42 through conduit 144 into rearward chamber 146 in tilt cylinder 18 to tilt piston 20 to the left in FIG. 2. At the same time fluid is entering rearward chamber 146 of tilt cylinder 18, fluid is also leaving forward chamber 136 of tilt cylinder 18 through conduit 134. The fluid flow through conduit 134 may follow one of two paths to reservoir 40 via conduit 132, tilt control 44, and conduit 148.

When buttons 169 on the lower side of lift piston 24 are seated on the end of lift cylinder 22, placing forks 26 in their fully lowered position, the pressure in chamber 128 is zero resulting in a zero pressure in second pressure chamber 70 of tilt check cavity 56 via conduit 126 annular space 74 and conduit 152. Spring 150 will, therefore, force tilt check spool 88 to the left in FIG. 2 providing a flow path for fluid from conduit 134 to conduit 132 through annular space 82, center section 106 and annular space 80.

When the load engaging members 26 are not in their fully lowered position, lift piston 24 will be intermediate the ends of lift cylinder 22 and the fluid in chamber 128 will be pressurized. This pressure will also exist in second pressure chamber 70 of tilt check spool cavity 56 via conduit 126 annular space 74 and conduit 152. In this latter instance, the pressure in second pressure chamber 70 will be great enough, due to the low preload on and the low rate of spring 150, to force tilt check spool 88 to the right in FIG. 2 sealing annular spaces 80 and 82 from one another in tilt check spool cavity 56 by enlarged portion 100. The tilt spool 86, which operates independently of the location of forks 26 relative to mast 12, may be located in either the first or second position. If the tilt spool is located in the first position as indicated in FIG. 2, fluid will flow from conduit 134 to conduit 132 via annular space 82, conduit 140 annular space 78, center section 104, annular space 76, conduit 138, and annular space 80. When lift spool 86 is located in the second position, enlarged portion 94 contacts the land between annular spaces 76 and 78 and blocks the flow path for fluid through lift spool cavity 54 from annular space 78 to annular space 76. When tilt spool 86 is in the second position the fluid flow through conduit 134 would follow the path through annular space 82, conduit 140, annular space 78 and be blocked by check valve 142. In such an instance, fluid would be prevented from leaving forward chamber 136 and thereby further movement of tilt piston 20 within tilt cylinder 18 would be prevented thereby preventing further forward tilting of mast 12.

Reverse tilting of mast 12 is always possible when tilt check spool 88 and tilt spool 86 are in their second positions since fluid is added to chamber 136 and removed from chamber 146. Since the fluid is flowing in the opposite direction from its flow during forward tilting, the fluid may readily pass through the one way block created by check valve 142. In this latter instance the flow of fluid from pump 38 to chamber 136 would follow the path of conduit 42, tilt control 44, conduit 132 annular space 80, conduit 138, annular space 76, check valve 142, annular space 78, conduit 140, annular space 82, and conduit 134. The fluid leaving chamber 146 would enter reservoir 40 via conduit 144, tilt control 44 and conduit 148.

Tilt spool 86 operates in the following manner. Forward chamber 136 of tilt cylinder 18 is connected to first pressure chamber 62 of tilt spool cavity 54 via conduits 157 and 159 and orifice 168. Rearward chamber 146 of tilt cylinder 18 is connected to second pressure chamber 68 of tilt spool cavity 54 via conduits 156 and 156b. The pressure in first pressure chamber 62 is equal to the pressure in forward chamber 136 while the pressure in second pressure chamber 68 is equal to the pressure in rearward chamber 146. During forward tilting of mast 12 a force will be exerted on tilt piston 20 tending to pull the tilt piston to the left in FIG. 2. As the force on tilt piston 20 increases the pressure in forward chamber 136 exceeds the pressure in rearward chamber 146. The difference between the pressure in chamber 136 times the area of tilt piston 20 on which the pressure acts and the pressure in chamber 146 times the area of tilt piston 20 on which the pressure acts is equal to the force on rod 36. By proper design, the force acting on each side of tilt piston 20 caused by the pressure in forward chamber 136 and rearward chamber 146 can be made proportional to the force exerted respectively on the ends of enlarged portions 96 and 94 of tilt spool 86 by the pressure existing in first pressure chamber 62 and second pressure chamber 68. When the force exerted on the end of enlarged portion 94 in chamber 62 exceeds the combined force exerted by compression spring 112a and the force exerted on the end of enlarged portion 96 in chamber 68, tilt spool 86 will move to the left in FIG. 2 to the second position and seal the fluid flow path through annular space 78, center section 104 and annular space 76.

It is desirable not to stop the forward tilting of mast 12 too rapidly when an overload condition approaches. The kinetic energy of a rapidly stopped load 30 may be great enough to overturn truck 10. Spring 112a should therefore have a relatively high spring rate and a relatively low preload which will result in a positioning of tilt spool 86 between its first and second positions in proportion to the magnitude of the difference of a relatively high pressure in chamber 136 and a relatively low pressure in chamber 146. This positioning of tilt spool 86 will result in a gradual slowing of the rate of movement of tilt piston 20 as the tilt spool continues to approach the second position and accordingly a gradual stopping of the forward tilting of mast 12. The tapered end 107 on enlarged portion 94 also aids the gradual slowing of the rate of fluid flow out of chamber 136 of tilt cylinder 18 and accordingly a gradual stopping of the forward tilting of mast 12.

Figure 3:
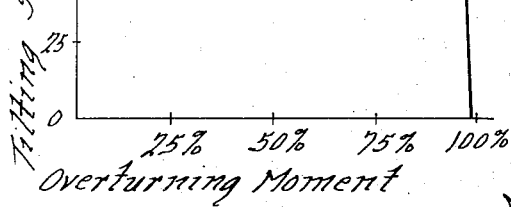
FIG. 3 is a graph of the tilting speed of the mast plotted against the percentage of the load moment needed to overturn the lift truck.

The forward tilting speed of mast 12 is plotted against the forward overturning moment about axle 34 in FIG. 3. The 100 on the tilting speed axis indicates the maximum speed at which the mast would tilt in the absence of a forward overturning moment. The 100 percent on the overturning moment axis indicates the maximum moment that can be applied before forward tilting of the truck becomes a serious problem to its continued safe operation. The dash line indicates the forward tilting speed of a mast on a truck not having an overload protection device. The forward tilting speed of such a truck increases as the forward overturning moment increases resulting in an increase in the forward kinetic energy of the mast. By properly choosing spring 112a the forward tilting speed can be reduced with the disclosed overload protection device by restricting the flow of fluid around center section 104 as the overturning moment increases thereby reducing the forward kinetic energy to a safe value as indicated by the solid line in FIG. 3. It should be kept in mind that if the forward overturning speed is restricted too rapidly the efficiency of the truck will suffer when heavy loads are moved. Once the formal tilting speed is reduced to a safe value, e.g., 50 percent at 95 percent forward overturning moment, the flow of fluid from chamber 136 may be rapidly restricted with a further relatively small increase in the forward overturning moment until all fluid flow out of chamber 136 is stopped at a point just short of 100 percent forward overturning moment.

An overload condition could exist when mast 12 is tilted in a rearward position. The load engaging members can be lowered in this instance but the mast cannot be forward tilted. The fact that mast 12 cannot be forward tilted could prevent the removal of a load 30 on forks 26. The operation of tilt check spool 88 permits the removal of the load in such an instance.

Whenever forks 26 are raised to a position above their fully lowered position the fluid in chamber 128 is pressurized. Spring 150 is chosen so that only a nominal pressure in chamber 128 is needed to move tilt check spool 88 to the second position sealing annular spaces 80 and 82 from one another through tilt check spool cavity 56. This movement is caused by the application of pressure into chamber 70 via conduit 126, annular space 74 and conduit 152. When forks 26 are in the raised position, forward tilting of mast 12 is, therefore, solely dependent upon the position of tilt spool 86. However, when load engaging members 26 are fully lowered, the buttons 169 of lift piston 24 contact one end of lift cylinder 22 causing the pressure of the fluid in chamber 128 to become zero and accordingly the pressure of the fluid in chamber 70 to become zero via conduit 152, annular space 74, check valve 129 or center section 102 and annular space 72 then, conduit 124, lift control 46 and conduit 148. Spring 150 will force tilt check spool 88 to the left in FIG. 2 permitting forward tilting of mast 12 by allowing fluid to exit from chamber 136 of tilt cylinder 18 via conduit 134, annular space 82, center portion 106, annular space 80, conduit 132, tilt control 44, and conduit 148. This will occur irrespective of the location of tilt spool 86. Forward tilting of mast 12 when load engaging members 26 are fully lowered can have little adverse effect on the safety of lift truck 10 even though an overload condition does exist since the forward tipping of the truck will be resisted by contact between the forks and the ground.

Orifice 168 in conduit 159 prevents the rapid transfer of the pressure of the fluid in chamber 136 to chamber 62. In the absence of orifice 168 fluttering of tilt spool 86 could occur causing false stopping of the forward tilting function of mast 12. Further, such fluttering could also indicate that a safe condition existed when in reality a forward overturning moment exceeded the stability moment. This would result in the forward tilting of lift truck 10. If orifice 168 is too small in area, the response time of tilt spool 86 is impaired. If, however, the orifice area is too large the spool will be unstable or will overshoot before returning to its steady state position.

Lifting the Load

During the lifting of forks 26 relative to mast 12, lift control 46 is actuated to direct fluid from pump 38 into chamber 138 in lift cylinder 22 via conduits 42 and 124, annular space 72, center section 102, annular space 74, and conduit 126. Simultaneously fluid will be flowing out of chamber 131 into reservoir 40 via conduit 130, lift control 46 and conduit 148. If lift spool 84 is in the second position, as illustrated in FIG. 2, fluid will be prevented from flowing into chamber 128 and additional force cannot be exerted against lift piston 24, by an increase in pressure in chamber 128 to raise forks 26.

The lowering of forks 26 is always possible regardless of the position of lift spool 84. Fluid is forced into chamber 131 via pump 38, conduit 42, lift control 46, and conduit 130. When lift spool 84 is in the first position the fluid will flow from chamber 128 in lift cylinder 22 to reservoir 40 via conduit 126, annular space 74, center section 102, annular space 72, conduit 124, lift control 46, and conduit 148. If lift spool 84 is in the second position the flow of fluid from conduit 126 to conduit 124 will be via check valve 129.

Lift spool 84 operates in the following manner. As previously described for tilt spool 86, the pressure of the fluids in chambers 136 and 146 within tilt cylinder 18 will be the same as the pressure of the fluids in chambers 60 and 66 respectively. By proper design, the force, created by the fluid pressure, acting on the ends of enlarged portions 90 and 92 can be made proportional to the forces acting on the opposite sides of tilt piston 20. When the force on the end of enlarged portion 90 exceeds the combined force exerted by compression spring 112 and the force exerted on the end of enlarged portion 92, lift spool 84 will move to the left in FIG. 2.

The rapid stopping of the elevation of forks 26 as an overload condition approaches is not as serious a problem to the safe operation of the truck as the rapid stopping of the forward tilting of mast 12. It is however desirable to be able to raise the forks as fast as possible during operation of truck 10 to maintain high productivity. Spring 112 should, therefore, have a relatively low spring rate and a relatively high preload which will result in a relatively fast movement of lift spool 84 during the sealing of annular spaces 72 and 74 from one another with a slight increase in the overturning moment. This relatively fast movement of lift spool 84 will result in a rapid stopping of the movement of lift piston 24 and accordingly a rapid stopping of forks 26.

Figure 4:
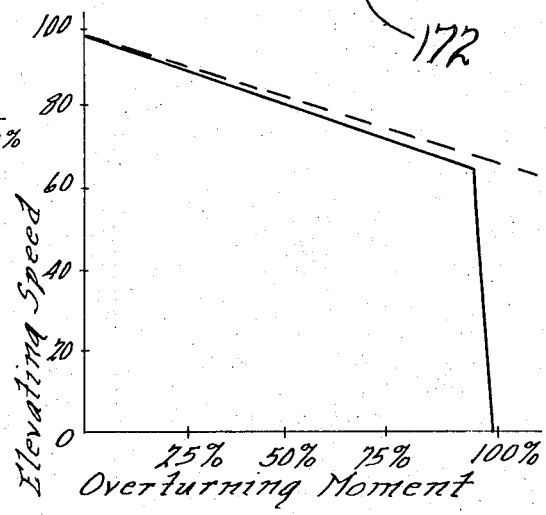
FIG. 4 is a graph of the elevation speed of the load engaging members plotted against the percentage of the load moment needed to overturn the lift truck.

The graph in FIG. 4 illustrates the elevation speed of forks 26 plotted against the forward overturning moment on the truck. In this graph the load moment is the percentage of the vehicles rated maximum capacity with a constant load center, i.e. a constant distance $l_1$ of the horizontal projection of the center of gravity 32 from axle 34. The 100 on the elevation speed axis in the graph indicates the maximum elevation speed of the forks without a load. The 100 percent on the overturning moment axis indicates the maximum moment that can be applied to the truck before forward tilting of the truck becomes a serious problem to its continued safe operation. A typical lift truck without overload protection would follow the dash line indicated on the FIG. 4 graph. As the load moment increases the elevation speed accordingly decreases. It is desirable to maintain the elevation speed of forks 26 with an overload protection device as close as possible to the elevation speed of the forks without such a control. By proper spring selection, the overload control can be designed to follow the elevation speed line of the typical lift truck without overload controls up to the point of approximately 95 percent overturning moment. At that point, the elevation speed drops off rapidly until it reaches zero just prior to reaching the maximum forward overturning moment. To accomplish this, spring 112 should have a relatively high preload and a relatively low rate. This will result in the lift spool 84 remaining relatively stationary until the forward overturning moment reaches the overload condition. At that point the spring preload force and the force on enlarged portion 92 will be overcome by the fluid force on enlarged portion 90 and due to the relatively low spring rate, a further increase in the overturning moment will rapidly move lift spool 84 to the sealing position and stop the further raising of the forks.

The operation of orifices 160 and 164 and check valve 162 is somewhat similar to the operation of orifice 168. In order to prevent fluttering of lift spool 84 with a single orifice, the orifice would have to be of such a small size that there would be a gradual increase in the pressure in chamber 60 when the vehicle was near overload and accordingly a gradual sealing of lift spool 84. Although such a circumstance is completely acceptable with tilt spool 86 it is desirable to close lift spool 84 as rapidly as possible when an overload condition approaches. When the pressure in chamber 136 in tilt cylinder 18 is greater than the pressure in chamber 60 fluid will flow through conduits 157 and 158 through check valve 162 and through both orifices 160 and 164. The double flow through orifices 160 and 164 will provide enough fluid to chamber 60 to provide an almost instantaneous increase in the pressure of chamber 60 proportional to the increase in the pressure of the fluid in chamber 136. However, when the pressure of the fluid in chamber 60 is greater than the pressure of the fluid in chamber 136 the reverse flow will occur through orifice 160 and conduits 157 and 158. This flow will be prevented from going through orifice 164 due to the blocking action of check valve 162. Since orifice 160, by design is much smaller than orifice 164 a gradual transfer of fluid will occur from chamber 60 to chamber 136. This gradual transfer will result in a great reduction in the fluttering of lift spool 84.

Construction of the Piston-Cylinder Device

A double action piston-cylinder device 18 is illustrated generally in FIG. 2 and in detail in FIG. 5. Since the general operation and construction of such piston-cylinder devices are well known, only those portions relevant to the invention will be described. A cylindrical shell 172 is sealed at its ends by end plates 174 and 176. Tilt piston 20 is in sliding engagement with the interior of shell 172 and together therewith and end plates 174 and 176 respectively defines forward chamber 136 and rearward chamber 146. Rod 36 connected to piston 20 projects outwardly through end plate 174. Conduit 134 is adapted to communicate with chamber 136 through a passage 178 in end plate 174. An annular resilient rubber disk 180 secured to piston 20 has an annular flat surface 181 for sealing one end of passage 178 from chamber 136 when piston 20 reaches a position that is a short distance away from end plate 174, e.g., one quarter of an inch. The annular shape of disk 180 provides a 360° sealing surface 181 that is unaffected by rotation of piston 20 relative to cylindrical shell 172. Conduit 157 is adapted to communicate with chamber 136 through a passage 182 in end plate 174. Passage 182 is always in communication with chamber 136.

Conduits 144 and 156, respectively, are adapted to communicate with chamber 146 through centrally located passage 184 and through offset passage 186 in end plate 176. Passage 186 is always in communication with chamber 146. A cylindrical resilient rubber plug 188 is centrally located in piston 20 and has a flat end 190 for sealing passage 184 from chamber 146 when piston 20 is located a short distance away from end plate 176, e.g., one quarter of an inch. A cup-shaped hole 191 having a conical portion 192 encircles plug 188. During contact between plug 188 and end plate 176, the plug is compressed into opening 19 and retained thereby to maintain its sealing effect.

Operation of the Piston-Cylinder Device

During operation of tilt cylinder 18, a pressure differential comes into existence between the fluids in chambers 136 and 146. When the pressure of the fluid in chamber 136 becomes a given amount larger than the pressure of the fluid in chamber 146, the overload control valve actuates, as previously described, to stop the further forward tilting of mast 12 by stopping fluid flow through conduit 134 and the further lifting of forks 26 by stopping fluid flow through conduit 124. It may occur, however, in the absence of disk 180, that piston 20 will contact end plate 174 of cylinder 18 placing the mast 12 in a fully forward tilted position. The pressure of the fluid in chamber 136 in such an instance would be zero since the force of piston 20 would be directly against end plate 174. If the forks were thereafter raised, the forward overturning moment would increase. Since the pressure of the fluid in chamber 136 would, however, be zero, no overload signal would be forwarded to overload control valve 48 to stop the further lifting of forks 26. This could result in the overturning of lift truck 10.

Disk 180 prevents the piston 20 from contacting end plate 174. The disk contacts end plate 174 and seals passage 178. As the force increases on piston 20 the sealing force also increases. Since the fluid cannot flow through passage 178 and passage 182 is dead-ended into chambers 60 and 62, a high pressure reading will always exist in chamber 136. As the force on piston 20 increases the pressure of the fluid in chamber 136 will also increase thereby providing the necessary high pressure signal needed to actuate overload control valve 48. Since disk 180 is made out of a resilient material little if any force is transmitted by it to end plate 174.

In the absence of stop 188, piston 20 could engage end plate 176 resulting in the pressure of the fluid in chamber 146 going to zero. This condition would occur when mast 12 was tilted to its backmost position. Since a difference in pressure between the fluids in chambers 136 and 146 is used to actuate overload control valve 48, the placing of the fluid in chamber 146 at zero could result in false tripping of the system preventing lifting of forks 26 and forward tilting of mast 12. Stop 188 therefore seals passage 184 and accordingly conduit 144 prior to contact between piston 20 and end plate 176 to insure that a representative fluid pressure, i.e., a pressure proportional to the force on piston 20, is always present in chamber 146. Again, since plug 188 is made out of a resilient material, little if any force is transmitted by it to end plate 176. Further, the compression of plug 188 into opening 191 increases the plugs sealing effect and life.

Passages 182 and 186 are positioned to always be in communication with chambers 136 and 146 respectively. This results in the transfer of the pressure of the fluid in the chambers to overload control valve 48. In designing the spools and the tilt cylinder it is necessary to consider that the cross-sectional areas on which any given pressure acts must be proportional throughout the system. For example, since the cross-sectional area of that portion of piston 20 in chamber 136 is less than the cross-sectional area of that portion of piston 20 in chamber 146, the cross-sectional areas of enlarged portions 90 and 94, respectively, in chambers 60 and 62 must also be less than the enlarged portions 92 and 96, respectively, in chambers 66 and 68 by an amount proportional to the difference of the two cross-sectional areas of piston 20. In designing both the tilt cylinder 18 and overload control valve 48 the following formula should be considered:

$$P_{136} A_{136} = F + P_{146} A_{146},$$

where: $P_{136}$ is the pressure of the fluid in chamber 136; $A_{136}$ is the area of piston 20 on which pressure $P_{136}$ is applied; $F$ is the force exerted on rod 36 of piston 20; $P_{146}$ is the pressure of the fluid in chamber 146; and $A_{146}$ is the area of piston 20 on which pressure $P_{146}$ is applied. It should be appreciated that means, other than conduits, for transferring the forces $P_{136} A_{136}$ and $P_{146} A_{146}$ to the respective spools are also contemplated, e.g., pressure transducers in cylinder 18 which actuate solenoids which are connected to spools 84 and 86.

Figure 7:
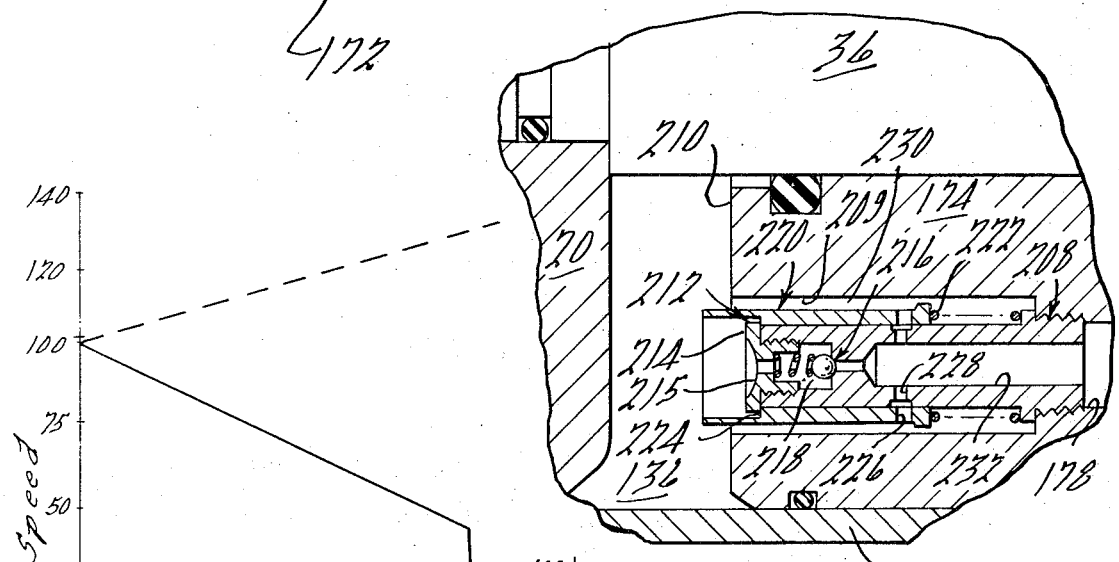
FIG. 7 is another enlarged view of area A in FIG. 5 embodying still other features of the invention.

FIGS. 6 and 7 illustrate other devices which are usable to seal passage 178 in tilt cylinder 18. These devices may be used in place of annular disk 180.

Construction of the FIG. 6 Modification

In FIG. 6, a spring 194 in the form of a band has one end 196 attached to end plate 174 by a known fastening device (not shown) and another end 197 bent upon itself to form a "V" shaped member in side elevation having a resilient contact portion 198. Passage 178 has a circular enlarged portion 200 adjacent chamber 136. A circular resilient rubber washer 202, having a diameter greater than enlarged portion 200 is interposed between a metal plug 204 and end 197 of spring 194. The diameter of plug 204 is slightly less than the diameter of enlarged portion 200. A rivet 206 rigidly secures end 197 of spring 194 to washer 202 and plug 204.

Operation of the FIG. 6 Modification

In forward tilting of mast 12, as tilt piston 20 approaches end plate 174 of tilt cylinder 18 contact is made between resilient portion 198 of spring 194 and the piston. Resilient portion 198 moves toward end plate 174 and forces plug 204 into enlarged portion 200 sealing passage 178. Further movement of piston 20 toward end plate 174 results in increased force on resilient portion 198 squashing rubber washer 202 against end plate 174 and increasing the sealing force. In rearward tilting of mast 12, an increase in fluid pressure in passage 178 results in the application of force against plug 204 causing, together with the venting of chamber 146, movement of tilt piston 20 away from end plate 174. This movement eventually releases the force on resilient portion 198, and the spring 194 returns to the released position illustrated in FIG. 6 and allows fluid to enter chamber 136 from passage 178.

Construction of the FIG. 7 Modification

A cylindrical tube 208 projecting through an enlarged circular opening 209 in end plate 174 is threadably engaged at one end with end plate 174 and concentric with passage 178. Tube 208 terminates at the other end at a position short of chamber defining surface 210 of end plate 174. An annular ring 212 is in threaded engagement with the end of tube 208 adjacent surface 210 and has a collar 214 projecting radially beyond the outer surface of tube 208 and a disk-shaped indentation 215 facing piston 20. A check valve 216 is located in a cavity 218 defined by tube 208 and ring 212 and permits a fluid flow in one direction from passage 178 to chamber 136. A plunger 220 is in sliding engagement with the exterior of tube 208 within opening 209 and has one end projecting into chamber 136. A spring 222, encircling tube 208, biases a portion of plunger 220 into chamber 136 to an open position in which an annular shoulder 224 on plunger 220 contacts collar 214. In the open position, radial ports 226 in plunger 220 communicate with radial ports 228 in tube 208 and with a passage 230 defined by opening 209 and the exterior of a plunger 220. Aligning means (not illustrated), such as a key in tube 208 located in a key way in plunger 220, are used to maintain alignment between ports 226 and 228. Ports 228 further communicate with a centrally located passage 232 in tube 208 that is concentric with passage 178.

Operation of the FIG. 7 Modification

In forward tilting of mast 12, when tilt piston 20 approaches end plate 174 contact is made between the piston and one end of plunger 220 forcing the plunger to move to the right in FIG. 7. Movement of plunger 220 moves ports 226 and 228 out of alignment thereby preventing further fluid from flowing out of chamber 136 through passage 178 via passage 230, ports 226 and 228 and passage 232. The stoppage of the fluid flow occurs prior to contact between tilt piston 20 and end plate 174, thereby maintaining a fluid pressure in chamber 136. In rearward tilting of mast 12, fluid is forced through passages 178 and 232, check valve 216, cavity 218 and into disk-shaped indentation 215 and then against piston 20. As piston 20 moves away from end plate 174, spring 222 forces plunger 220 to the left in FIG. 7 to open communication between ports 226 and 228 and thereby permit a further flow of fluid into chamber 136 via passage 230. If desired openings, not shown, may be provided in plunger 220 to permit fluid to flow out of the space defined by piston 20, plunger 220 and ring 212 into the larger space defined between piston 20 and end plate 174.

What is claimed is:

1. A vehicle comprising:
   a frame;
   a load member mounted on the frame for movement relative to the frame,
   a cylinder having first and second ends and defining a cavity;
   a piston within the cavity and dividing the cavity into first and second chambers partially bound by the first and second cylinder ends, the piston being movable through the cavity between the first and second cylinder ends;
   a first passage proximate the first cylinder end and communicating with the first chamber;
   a second passage proximate the second cylinder end and communicating with the second chamber;
   a rod connected to the piston and projecting out of the cavity through one of the cylinder ends;
   means connecting the rod and cylinder to the load member and frame to move the load member relative to the frame in response to movement of the piston relative to the cylinder;

valve means responsive to a difference in pressure between the first and second chambers to prevent movement of the load member in one direction relative to the frame;

means to add fluid to one chamber and remove fluid from the other chamber through the first and second passages to move the piston relative to the cylinder; and means operative to seal the first passage when the piston is a given distance from the first cylinder end.

2. A vehicle according to claim 1 further including means operative to seal the second passage when the piston is a given distance from the second end.

3. A piston-cylinder device for use on a vehicle having a frame, a load member connected to the frame and movable relative thereto, a circuit for the transfer of fluid, and a suitable device operable in response to a difference in fluid pressure between two sources to prevent movement of the load member relative to the frame, the piston-cylinder device comprising:

a cylinder having first and second ends and defining a cavity;

a piston located within and dividing the cavity into opposite chambers partially bounded by the first and second ends of the cylinder, the piston having first and second sides respectively facing the first and second ends of the cylinder;

a rod connected to the piston and extending outwardly of the cylinder through one of the ends of the cylinder;

means adapted to interconnect the rod and the cylinder to the load member and the frame for movement of the load member relative to the frame in response to movement of the piston relative to the cylinder;

means defining a passage at each of the ends of the cylinder communicating with each of the opposite chambers in the cylinder and adapted to ommunicate with the circuit whereby fluid may be introduced through one passage into one chamber and withdrawn through the other passage from the other chamber to move the piston relative to the cylinder;

means operative to transmit a signal representative of the magnitude of the fluid pressure in each chamber to the suitable device; and means operative in response to movement of the piston to a position proximate the first end of the cylinder to seal the passage at the first end of the cylinder.

4. A piston-cylinder device according to claim 3 wherein the means operative in response to movement of the piston, seals the passage prior to contact of the first side of the piston with the first end of the cylinder to maintain a pressure in the chamber at the first end of the cylinder substantially equal to $(F + P_2A_2)/A_1$ where: $F$ is the force on the rod; $P_2$ is the pressure of the fluid in the chamber at the second end of the cylinder, $A_2$ is the area of the second side of the piston; and $A_1$ is the area of the first side of the piston.

5. A piston-cylinder device according to claim 4 further comprising means operative in response to movement of the piston to a position proximate the second end of the cylinder to seal the passage at the second end of the cylinder prior to contact of the second side of the piston with the second end of the cylinder to maintain a pressure in the chamber at the second end of the cylinder equal to $(F + P_1A_1)/A_2$ where $P_1$ is the pressure of the fluid in the chamber at the first end of the cylinder.

6. A piston-cylinder device according to claim 3 wherein the means operative in response to movement of the piston includes a resilient member secured to and projecting away from the first side of the piston toward the first end of the cylinder and wherein the leading surface of the resilient member seals the passage at the first end of the cylinder when the first side of the piston is a predetermined distance away from the first end of the cylinder.

7. A piston-cylinder device according to claim 3 wherein the means operative in response to movement of the piston includes:

a cover at the first end of the cylinder adapted to seal the passage at the first end of the cylinder;

means secured to the cover and the cylinder to bias the cover away from the passage at the first end of the cylinder; and resilient means secured to the cover intermediate the cover and the first side of the piston and adapted to be compressed by the first side of the piston to force the cover to seal the passage at the first end of the cylinder when the piston is a predetermined distance away from the first end of the cylinder.

8. A piston-cylinder device according to claim 3 wherein:

the passage at the first end of the cylinder includes an enlarged tubular portion communicating with the passage at the first end and with the chamber at the first end; and the means operative in response to movement of the piston includes:

a plunger operative to move within and relative to the tubular portion between a first and a second position and having an end portion projecting into the chamber at the first end of the cylinder and a passage communicating with the chamber at the first end of the cylinder and with the passage at the first end of the cylinder when the plunger is in the first position and spaced from the passage at the first end of the cylinder when the plunger is in the second position; and means biasing the plunger to the first position.

9. A piston-cylinder device according to claim 8 further including a one-way check valve operative to provide a path for a flow of fluid from the passage at the first end of the cylinder to the chamber at the first end.

10. An overload protection device for use on a vehicle having a primary load member movably mounted on a frame and a secondary load member movably mounted on the primary load member and adapted to receive a load which creates a moment about a point on the frame, the device comprising:

first means responsive to a given magnitude of the moment to prevent movement of the primary load member in a given direction relative to the frame; and second means operative in response to positioning of the secondary load member in a given position with respect to the primary load member to override the first means and release the primary load member for movement in the given direction.

11. An overload protection device for use on a vehicle having a primary load member mounted on a frame for movement relative to the frame, a first piston-cylinder device for moving the primary load member relative to the frame in response to the introduction of fluid through a first passage into the first cylinder at one side of the first piston and the removal of fluid through a second passage into the first cylinder at the other side of the first piston, a secondary load member mounted for movement relative to the primary load member, and a second piston-cylinder device for moving the secondary load member relative to the primary load member in response to the introduction of fluid through a third passage into the second cylinder at one side of the second piston, the overload protection device comprising:

first means responsive to a difference in fluid pressure at the opposite sides of the first piston to move between a first position and a second position;

second means adapted to prevent movement of the primary load member relative to the frame in one direction when the first means is in the second position;

third means responsive to a given fluid pressure on one side of the second piston to move between a first position and a second position; and fourth means operative in response to the positioning of the third means in the first position to override the second means and enable the primary load member to move in said direction relative to the frame.

12. An overload protection device according to claim 11 wherein:

the second means includes a fluid passage adapted to be located in series with one of the passages communicating with the first cylinder, the passage of the second means is open when the first means is in the first position and sealed when the first means is in the second position; and the fourth means includes a fluid passage in parallel with the passage of the second means, the passage of the fourth means is open when the third means is in the first position and sealed when the third means is in the second position.

13. An overload protection device according to claim 12 including a one-way check valve in parallel with the passage of the second means and bypassing the sealed portion of the passage of the second means, the check valve enables fluid to flow into the first cylinder and blocks fluid from flowing out of the first cylinder.

14. An overload protection device according to claim 11 including means to bias the first means to the first position, the biassing means has a relatively high biasing rate and a relatively low preload force.

15. An overload protection device according to claim 11 including dampening means to control the movement of the first means between the first and second positions at a relatively slow rate of travel in response to relatively rapid changes in the magnitude of the difference in pressure.

16. An overload protection device according to claim 11 including:

fifth means responsive to a difference in fluid pressure at the opposite sides of the first piston to move between a first position and a second position; and sixth means adapted to prevent movement of the secondary load member in one direction relative to the primary load member when the fifth means is in the second position.

17. An overload protection device according to claim 16 wherein the sixth means includes a fluid passage adapted to be located in series with the third passage, the passage of the sixth means is open when the fifth means is in the first position and sealed when the fifth means is in the second position.

18. An overload protection device according to claim 17 including a one-way check valve in parallel with the passage of the sixth means which bypasses the sealed portion of the passage of the sixth means, the check valve enables fluid to flow out of the second cylinder and blocks fluid from flowing into the second cylinder.

19. An overload protection device according to claim 16 including means to bias the fifth means to the first position, the biasing means has a relatively low biasing rate and a relatively high preload force.

20. An overload protection device according to claim 16 including dampening means to control the movement of the fifth means between the first and second positions at a relatively slow rate of travel in response to relatively rapid changes in the magnitude of the difference in pressure.

21. An overload protection device according to claim 20 wherein the dampening means enables movement of the fifth means at a relatively slow rate of travel during relatively rapid decreases in the magnitude of the difference in pressure and at a relatively high rate of travel during relatively rapid increases in the magnitude of the difference in pressure.

22. A valve responsive to a difference in pressure at opposite sides of a first piston movable in a first cylinder between opposite ends of the cylinder to prevent movement of the first piston relative to one end of the first cylinder when the difference in pressure exceeds a predetermined value and when the pressure exerted at one side of a second piston in a second cylinder is above a predetermined value, the valve comprising:

a casing defining first and second cavities;

a first spool movable in the first cavity between a first position and a second position;

means biasing the first spool to the first position when the difference in pressure is below the predetermined value and to the second position when the difference in pressure is above the predetermined value;

a second spool movable in the second cavity between a first position and a second position;

means biasing the second spool to the first position when the pressure exerted at the one side of the second piston is below the predetermined value and to the second position when the pressure exerted at the one side of the second piston is above the predetermined value;

means defining first and second passages communicating with one another through the first cavity when the first spool is in the first position and sealed from one another through the first cavity when the first spool is in the second position; and means defining third and fourth passages communicating with one another through the second cavity when the second spool is in the first position and sealed from one another through the second cavity when the second spool is in the second position, the first and third passages communicate with one another, the second and fourth passages communicate with one another, the third passage is adapted to communicate with the space between the first piston and the one end of the first cylinder, and the fourth passage is adapted to communicate with a fluid transfer circuit.

23. A valve according to claim 22 wherein the means biasing the first spool includes:
a spring biasing the first spool to the first position;
first means adapted for exerting a force on the first spool proportional to the pressure within the first cylinder at the one end to move the first spool to the second position; and
second means adapted for exerting a force on the first spool proportional to the pressure within the first cylinder at the other end to move the first spool to the first position.

24. A valve according to claim 23 wherein the spring has a relatively low preload force and a relatively high rate.

25. A valve according to claim 23 wherein:
the first spool has a first end located relative to the first position and a second end opposite the first end and located relative to the second position;
the first means includes means defining a passage communicating with the first end of the first spool and adapted to communicate with the space at the one end of the first cylinder; and
the second means includes means defining a passage communicating with the second end of the first spool and adapted to communicate with the space at the other end of the first cylinder.

26. A valve according to claim 25 wherein:
the first cavity includes first and second enlarged annular spaces respectively communicating with the first and second passages;
the first spool includes first and second enlarged portions respectively defining the first and second ends and in sliding engagement with the first cavity, and a necked-down center action intermediate and connected to the enlarged portions and aligned with the enlarged annular spaces when the first spool is in the first position and spaced from the enlarged annular spaces when the first spool is in the second position whereby fluid may flow from one enlarged annular space to the other enlarged annular space around the necked-down center section when the first spool is in the first position and fluid will be blocked from flowing from one enlarged annular space to the other enlarged annular space when the first spool is in the second position by the first enlarged portions; and
means are provided on the first enlarged portion to regulate the fluid flow from one enlarged annular space to the other enlarged annular space when the first spool is proximate the second position.

27. A valve according to claim 22 wherein the means biasing the second spool includes:
a spring biasing the second spool to the first position; and
means adapted for exerting a force on the second spool proportional to the pressure within the second cylinder at the one side of the second piston to move the second spool to the second position.

28. A valve according to claim 27 wherein the spring has a relatively low preload force and a relatively low rate.

29. A valve according to claim 27 wherein:
the second spool has a first end located relative to the first position; and
the means adapted for exerting a force includes means defining a passage communicating with the first end of the second spool and adapted to communicate with the space at the one side of the second piston.

30. A valve for use on a vehicle having a load member mounted on a frame for movement by a piston located within a cylinder, the valve comprising:
a spool movable between a first and a second position;
means to decrease the rate of movement of the load member relative to the frame substantially in proportion to the amount of movement of the spool from the first position to the second position and to prevent movement of the load member relative to the frame in one direction when the spool is in the second position;
means operative to create a force on the spool to move the spool from the first position to the second position, the magnitude of the force being related to the magnitude of a moment acting on the load member about a point on the frame; and
a spring acting on the spool and yieldably biasing the spool to its first position, the spring having a relatively high rate and a relatively low preload to counteract the force and to allow movement of the spool to given locations between the first and the second positions that correspond to given magnitudes of the moment.

31. A valve according to claim 30 wherein the means to decrease the rate of movement is operative to decrease the rate of movement of the load member at one rate during a given portion of the movement of the spool from the first position to the second position and at another rate during the remaining portion of the movement of the spool from the first position to the second position.

32. A valve for use on a vehicle having a primary load member mounted on a frame for movement by a first piston located within a first cylinder, and a secondary load member mounted on the primary load member for movement relative to the primary load member by a second piston located within a second cylinder, the valve comprising:
a first spool movable between a first and a second position;
means to decrease the rate of movement of the primary load member relative to the frame in proportion to the amount of movement of the first spool from the first position to the second position and to retain the primary load member relative to the frame when the first spool is in the second position;

means operative to create a force on the first spool to move the first spool from the first position to the second position, the magnitude of the force being related to the magnitude of a moment acting on the primary load member about a point on the frame;

a first spring acting on the first spool and yieldably biasing the first spool to its first position, the first spring having a relatively high rate and a relatively low preload to counteract the force and to allow movement of the first spool to given locations between the first and the second positions that correspond to given magnitudes of the moment;

a second spool movable between a first and a second position;

means to prevent movement of the secondary load member in one direction relative to the primary load member when the second spool is in the second position;

means operative to create a force on the second spool to move the second spool from the first position to the second position, the magnitude of the force being related to the magnitude of the moment; and a second spring acting on the second spool and yieldably biasing the second spool to its first position, the second spring having a relatively high preload and a relatively low rate to counteract the force and to allow movement of the second spool from the first position to the second position at a relatively fast rate when the magnitude of the moment exceeds a predetermined value.

33. A valve for use on a vehicle having a load member mounted for movement relative to a frame by a piston located within a cylinder, the valve comprising:

a spool movable between a first and a second position;

means to prevent movement of the load member in one direction relative to the frame when the spool is in the second position;

means operative to create a force on the spool to move the spool from the first position to the second position, the magnitude of the force being related to the magnitude of a moment acting on the load member about a point on the frame; and a spring acting on the spool and yieldably biasing the spool to its first position, the spring having a relatively high preload and a relatively low rate to counteract the force and to allow movement of the spool from the first position to the second position at a relatively fast rate when the magnitude of the force on the spool exceeds a predetermined value.

34. A valve for use on a vehicle having a frame, a primary load member which is movable away from the frame by movement of a first piston within a first cylinder, having first and second ends, toward the first end of the first cylinder, and a secondary load member which is movable relative to the primary load member by movement of a second piston within a second cylinder, having first and second ends, toward the first end of the second cylinder, the movement of the pistons being caused by a flow of fluid into the second end of each of the cylinders and out of the first end of the respective cylinders, the valve comprising:

a first spool having first and second ends and being movable from a first position to a second position when the force on the first end is greater than the force on the second end;

means yieldably retaining the first spool in the first position;

means adapted to prevent movement of the first piston toward the first end of the first cylinder when the first spool is in the second position;

a second spool having first and second ends and being movable from a first to a second position when the force on the first end is greater than the force on the second end;

means yieldably retaining the second spool in the first position;

means adapted to prevent movement of the second piston toward the first end of the second cylinder when the second spool is in the second position;

means defining first and second passages adapted to be connected respectively to the spaces at the first and second ends of the first cylinder, the first and second passages respectively communicating with the first and second ends of each of the spools to transmit fluid between the first end of the first cylinder and the first end of each spool, and between the second end of the first cylinder and the second end of each spool; and means located within one of the passages to one of the spools to restrict the flow of fluid through the one passage to prevent rapid oscillation of the spool in response to rapid changes in the pressure of the fluid in the spaces at the first and second ends of the first cylinder.

35. A valve according to claim 34 wherein:

the one of the passages is the first passage;

the first passage includes first and second branch passages, the first branch passage communicates with the first end of the first spool and is adapted to communicate with the first end of the first cylinder and the second branch passage communicates with the first end of the second spool and is adapted to communicate with the first end of the first cylinder; and the means to restrict includes a first orifice located within the second branch passage in the path of the flow of fluid from the space at the first end of the first cylinder to the first end of the second spool, a second orifice in parallel with the first orifice, and a check valve in series with the second orifice, the check valve being open when the flow of fluid is toward the first end of the second spool and closed when the flow of fluid is away from the first end of the second spool.

36. A valve according to claim 34 wherein:

the one of the passages is the first passage;

the first passage includes first and second branch passages, the first branch passage communicates with the first end of the first spool and is adapted to communicate with the first end of the first cylinder and the second branch passage communicates with the first end of the second spool and is adapted to communicate with the first end of the first cylinder; and the means to restrict includes a first orifice located within the first branch passage in the path of the flow of fluid from the space at the first end of the first cylinder to the first end of the first spool.

37. A fluid actuated piston-cylinder assembly adapted to be connected to a circuit used for the transfer of fluid, the piston-cylinder assembly comprising:

a cylinder having opposite ends and defining a cavity;

a piston located within and dividing the cavity into opposite chambers partially bounded by the piston;

means for defining a passage at each end of the cylinder communicating with each of the opposite chambers and adapted to communicate with the circuit whereby fluid may be introduced through one passage into one chamber and withdrawn through the other passage from the other chamber to move the piston relative to the cylinder; and means operative in response to arrival of the piston to a position proximate to but spaced from one end of the cylinder for sealing the passage at the one end to maintain a quantity of fluid between the piston and the one end and thereby preclude further movement of the piston toward the one end of the cylinder.

38. A fluid actuated piston-cylinder assembly according to claim 37 wherein the operative means is located within the cylinder and is interposed between the piston and the one end of the cylinder.

39. A fluid actuated piston-cylinder assembly according to claim 38 wherein the operative means includes a resilient member secured to and projecting away from the piston toward the one end of the cylinder, the resilient member having a leading edge that encompasses and seals the passage at the one end when the piston is a predetermined distance away from the one end of the cylinder.

* * * * *

UNITED STATES PATENT OFFICE
CERTIFICATE OF CORRECTION

Patent No. 3,831,492            Dated August 27, 1974

Inventor(s)     Michael R. Young

It is certified that error appears in the above-identified patent and that said Letters Patent are hereby corrected as shown below:

Column 3, line 59, "formed" should read -- forward --. Column 4, line 43, "lost" should read -- low --. Column 6, line 38, "ranch" should read -- branch --. Column 9, line 58, "138" should read -- 128 --. Column 12, line 5, "19" should read -- 191 --. Column 15, line 39, "ommunicate" should read -- communicate --. Column 19, line 42, "action" should read -- section --.

Signed and sealed this 3rd day of December 1974.

(SEAL)
Attest:

McCOY M. GIBSON JR.          C. MARSHALL DANN
Attesting Officer             Commissioner of Patents

UNITED STATES PATENT OFFICE
CERTIFICATE OF CORRECTION

Patent No. 3,831,492          Dated  August 27, 1974

Inventor(s) Michael R. Young et al

It is certified that error appears in the above-identified patent and that said Letters Patent are hereby corrected as shown below:

Column 4, line 1, after "mass" delete -- of a portion --. Column 9, lines 3 and 4, delete "An overload---rearward position" and insert -- In the absence of tilt check spool 88, an overload condition could exist when mast 12 is tilted in a rearward position. --. Column 16, line 2, "F" should read -- -F --. Figure 1, "$M_{1g}$" should read -- $M_1 (g+a)$ --.

Signed and sealed this 11th day of February 1975.

(SEAL)
Attest:

RUTH C. MASON
Attesting Officer

C. MARSHALL DANN
Commissioner of Patents
and Trademarks